United States Patent [19]
Bayer

[11] 3,886,014
[45] May 27, 1975

[54] METHOD OF PRODUCTION OF A LIQUID CRYSTAL CELL

[75] Inventor: Helmut Bayer, Vienna, Austria

[73] Assignee: Firma Electrovac Fabrikation Electrotechnischer Spezialartikel Gesellschaft m.b.H., Vienna, Austria

[22] Filed: Apr. 16, 1973

[21] Appl. No.: 351,526

Related U.S. Application Data

[62] Division of Ser. No. 208,340, Dec. 15, 1971.

[30] Foreign Application Priority Data

Dec. 21, 1970  Austria ............................ 11509/70

[52] U.S. Cl. .................... 156/145; 65/43; 156/109; 156/222; 156/288; 156/311; 350/160 LC
[51] Int. Cl. ............................................ B32b 31/20
[58] Field of Search ........ 156/89, 99, 100, 102, 107, 156/145, 311, 106, 89, 109, 146, 222; 65/43; 53/38, 41, 43; 350/160 LC; 52/616; 161/45, 183, 190

[56] References Cited
UNITED STATES PATENTS

| | | | |
|---|---|---|---|
| 3,505,804 | 4/1970 | Hofstein | 350/160 LC |
| 3,544,294 | 12/1970 | Goto | 65/43 |
| 3,592,526 | 7/1971 | Dreyer | 350/160 LC |
| 3,625,591 | 12/1971 | Freiser | 350/160 LC |
| 3,667,925 | 6/1972 | Sheppard | 65/43 |
| 3,703,329 | 11/1972 | Castellano | 350/160 LC |

*Primary Examiner*—Charles E. Van Horn
*Assistant Examiner*—F. Frisenda, Jr.
*Attorney, Agent, or Firm*—Ernest G. Montague; Karl F. Ross; Herbert Dubno

[57] ABSTRACT

A method of production of a liquid crystal cell, which comprises the steps of covering a first plate with crystals of a crystal fraction. The limits deviate from each other in case of an upper crystal limit of no more than 25 um no more than 6 um and in case of an upper crystal limit of more than 25 um no more than 25% of the upper crystal limit. The crystals are arranged in one layer spaced apart at distances from each other. The distances surpass appreciably at an average the crystal size. A second plate is provided on the first plate covered with the crystals. The arrangement of the steps of providing first and second plates until a predetermined number of plates being obtained is repeated. The pile of the plates is heated with simultaneous application of pressure. The plates are hermetically connected at their edge zones with a provision of filling- and ventilating openings. The plates are then cooled off. The spaces defined between each pair of adjacent plates are filled with said crystal liquid, and the filling- and ventilating openings are hermetically filled.

6 Claims, 11 Drawing Figures

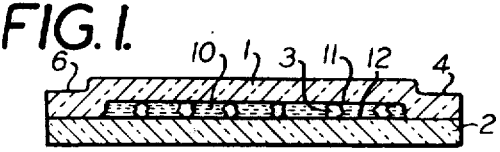
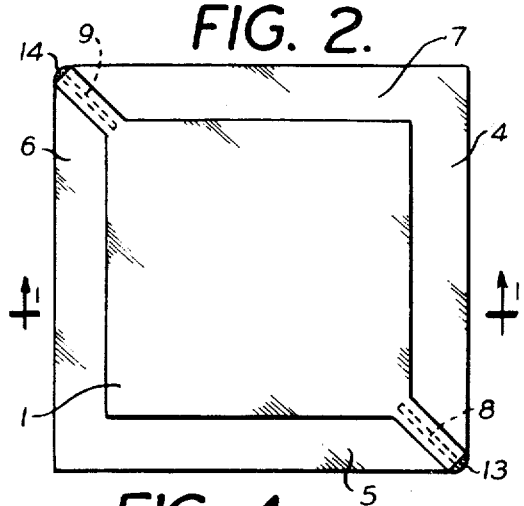
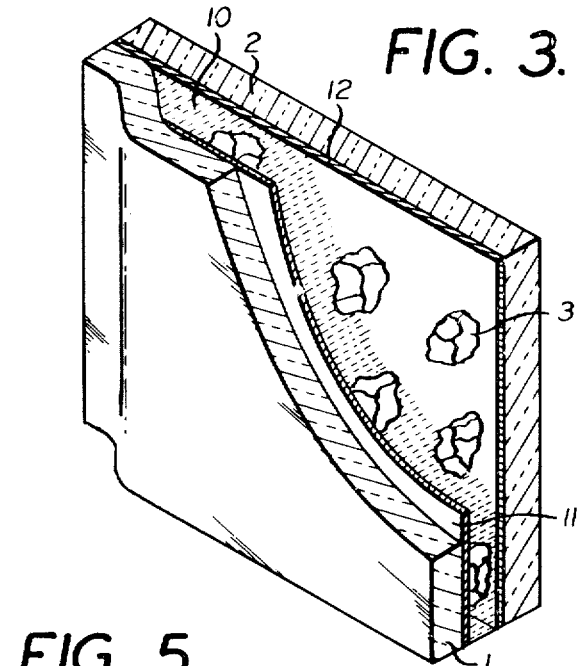
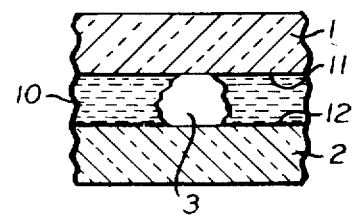
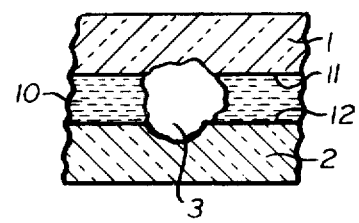
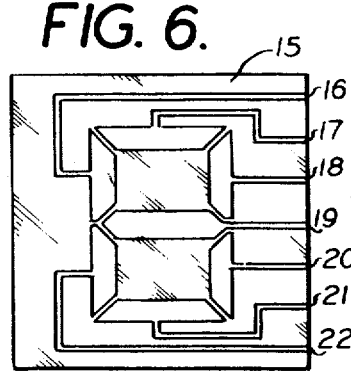
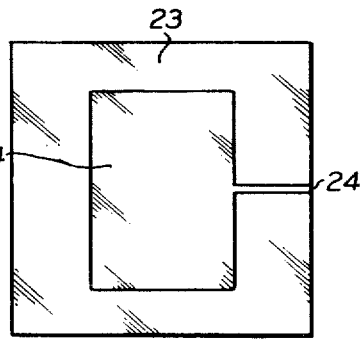
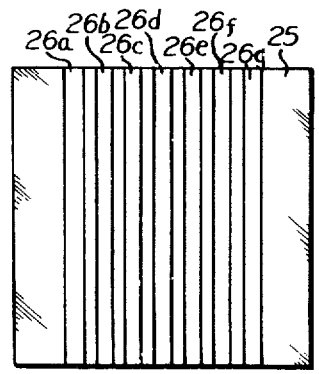
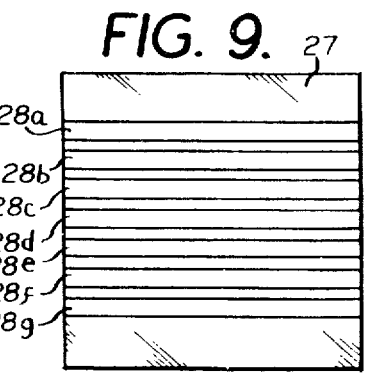
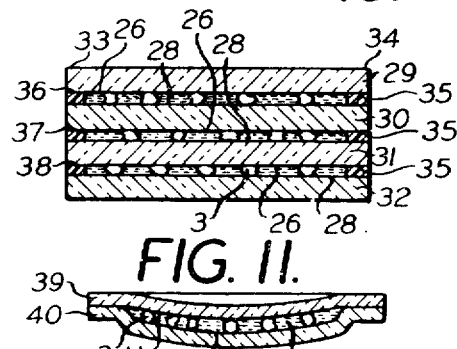

METHOD OF PRODUCTION OF A LIQUID CRYSTAL CELL

This is a divisional patent application to the copending patent application Ser. No. 208,340, filed Dec. 15, 1971.

The present invention relates to a method of production of a liquid crystal cell, in which the crystal liquid is embedded between plates of inorganic material, in particular glass, of which at least one is transparent and which are covered under circumstances with transparent or reflecting, respectively, thin-layer-electrodes, as well as a method for its production.

One understands under a liquid crystal cell, a controllable light gate or a controllable reflector, in which the particular characteristics occuring between the melting point and the clearing point of crystals, that means, anisotropic, liquids are exploited. In the embodiment as a light gate, all plates and thin-layer-electrodes must be transparent, in the embodiment as a reflector, one requires in addition to transparent plates and thin-layer-electrodes at least one reflecting thin-layer-electrode, whereby its carrier plate can be non-transparent.

For liquid crystal cells one uses in the practice first of all nematic crystal liquids and as controlling influence values preferably electric fields. For the practical application it is required, to form comparatively thin layers of the crystal liquid, the thickness of which is of the order of $10^0$ to $10^2$ $\mu$m, in particular of 5 to 30 $\mu$m. Until now one has proceeded such, that between plates of transparent material, preferably first of all of glass, which have been covered according to requirements with transparent of relecting, respectively thin-layer-electrodes, strips at the plate edge, or partly interrupted frame of a foil, the thickness of which corresponds with the open distance. As foil material has been used thereby mainly polyhexaflourethylene. After the filling of crystal liquid the cell has been closed with an epoxy resin. In this embodiment at some distance from the edge the permanency of the distance, in particular in case of pressure loads, something has been left open and desired. By this arrangement the production of large face liquid crystal cells is more difficult, if not impossible. Furthermore, the life duration is modest with about $10^4$ hours, for which, first of all, is named as cause, the non completely hermetic closure, which does not prevent sufficiently the founding-in of solvent vapors and atmospheric elements.

A summary view concerning the characteristics of crystal liquids can be found by example in the publication:

A. Sauper "Neuere Ergebnisse auf dem Gebiet der flussigen Kristalle" (Late results in the field of liquid crystals), Zeitschrift fur angewandte Chemie, 80th year (1968) pages 99-115, or in "H. Sackmann und D. Demus" Eigenschaften und Strukturen Thermotroper kristallineflussiger Zustande, (characteristics and structures of thermotropic cystal liquid states). Fortshcritte der chemischen forschung, 12th year (1969), pages 349-386. Practical applications are described by example in U.S. Pat. No. 2,400,877, No. 2,524,286, No. 2,544,659, No. 3,135,207 and No. 3,322,485 and in the publication "Electronics" of July 6, 1970, pages 64 to 70, and in the publication "Electronic Design" of Sept. 13, 1970, pages 76 to 81.

By the Austrian Pat. No. 284,361, a method for production of multiple-glass-units have been known, whereby the plates and the formation, of a stay at the edge have been molten and at least in one corner of the unit a drain hole is provided in the one plate, which is eventually tightly closed. For liquid crystal cells such produced multiple glass units are not usable, since the melting process required for their production would destroy the thin-layer-electrodes and the required narrow open distance cannot be produced or cannot be produced with the required tolerance, respectively.

By the Austrian Pat. Nos. 261,015 and No. 261,016 practically the use of a core of thick core layers for the production of an electrode system has become known, however, where the cores and crystals do not serve for narrow distancing of plates.

It is one object of the present invention, to provide a method of making a liquid crystal cell, in which the mentioned drawbacks are avoided and the create a liquid crystal cell corresponding better the rough practice conditions.

It is another object of the present invention to provide a method of making a liquid crystal cell, wherein for distancing of the plates a single layer of cores or crystals is provided there between, through which the open distance of the plates is determined, whereby the medium distance of the crystals is essentially larger, for example, at least ten times as large as the median core size, and the plates are furthermore, connected together at their edge zones, preferably by hot press welding or, by means of a glass solder hermetically for the purpose of filling of the crystal liquid filling - and airing - openings which remain free at first are hermetically closed.

Aside from the fact, that the desired aim is obtained, thereby, now essentially thinner plates can be used, compared with the known structures, which in addition to material and space saving offers the possibility for advantageous further developments of the present invention, which are set forth below. Also the production of large faced liquid crystals cells is essentially simplified by the present invention.

If plates covered with thin layer-electrodes are applied, the crystals must be laid as it is understood of insulating material.

While in the practice mainly nematic crystal liquids or mixtures with a nematic crystal liquids are applied as a main component for liquid crystal cells, the present invention is not limited thereto, rather extends to all sorts and mixtures, as long as they show only anisotropic qualities.

Concerning the narrowness of the crystal spectrum, no extreme requirements are necessarily set. It has been found in the practice as sufficient, to use crystal fractions, the limits of which are at an upper crystal limit of more than 25 $\mu$m no more than 25% of the upper crystal value and deviate at an upper crystal value of less or equal to 25 $\mu$m no more than 6 $\mu$um from each other. Such crystal fractions can be obtained by example by straining with strain fabrics according to DIN 4188; whereby even one step can be jumped over, as by example crystals of 25 $\mu$m to 32 $\mu$m open mesh width or from 28 $\mu$m to 36 $\mu$m open mesh width. Also reduction processes are known in which one obtains without sieves a narrow crystal spectrum by example by means of a spray mill, which is applied in particular at crystal sizes below 25 $\mu$m with advantage. Also by means of wind sifters one can obtain a usable narrow crystal spectrum.

The great tolerance relative to the crystal size can be permitted for the reason, that with the connection of the edge zones by means of hot press welding the crystals, which are pressed into the plates in the edge zones, as much as they are present there, penetrate in the remaining plate range partly into the plates, partly they are pressed slightly flat, whereby, the open distance sets with much narrower tolerance. It is also possible, by suitable selection of the working material, to aim at only the penetration or for only flat pressing, respectively. In case of a connection of the plates without heating, the narrow tolerance of the open distance is brought about such, that at first only the crystals disposed at the upper crystal limit are tightly clamped and it is thus possible, to remove the remaining by example by vibration.

The number of the filling-or airing-openings, respectively, can be reduced to a single opening for each liquid crystal layer, if the air between the distanced plates is evacuated prior to the filling of the crystal liquid, whereby suitably a three-way-cock is used. The closure of the filling-or airing-opening can in known manner take place without disadvantages by means of an epoxy resin, since the face, which engages the crystal liquid, is appreciably smaller than in the conventional embodiments and this engagement takes place in addition at a "dead arm." The closure can take place however, also by welding or melting, whereby again the "dead arm" protects the main quantity of the crystal liquid.

Since the cores cover concerning the face at a maximum of about 1% it is now of importance for many purposes of application, by example, for by light writing, if the cores consist of non-transparent material. One can, however, if necessary bring to disappearance optically sufficient, if they consist of a transparent material, which has at least approximately the same defraction index, as the crystal liquid. It is furthermore possible to hold free from cores without essential loss on rigidity, individual, no too large areas of the liquid crystal cell. In the recess of these areas, one uses suitably masks, sieve pressure gages, or the like.

Due to the fact, that now essentially thinner plates can be used without impairing the stability, it is easier possible, to form liquid crystal cells in form of more layers, that means, a plurality of plates are provided forming a pile, whereby in the intermediate spaces between the plates, crystal liquid is arranged. These separate layers of crystal liquid can advantageously consist of different crystal liquids, or are made with different crystal liquids in which foreign matter has been included. The configuration of the thin layer-electrodes can thereby be different from layer to layer. Also the production of curved liquid crystal cells is possible in a simple manner in connection with the embodiment of the present invention. Since, namely the plate pile is distanced over its surface by means of the cores or crystals after the connection of the plates by heating and following cooling it can be curved in a suitable form, without losing the exact distancing.

In accordance with a further development of the present invention, the liquid cell is formed as an image screen by example, for an oscillator, or for a television receiving device, whereby a device known per se for the production of the image screen is provided. For the formation as an image screen of a color television receiving device suitably as many layers of crystal liquid equipped with a liquid dotted with corresponding color material are provided, as basic colors are used for the creation of the color picture.

For the production of a liquid crystal cell, in accordance with the present invention, one provides suitably an arrangement, wherein the first plate is covered with cores of one core fraction, the limits of which deviate from each other at an upper core limit of less or equal to 25 $\mu$m no more than 6 $\mu$m and at an upper core limit of more than 25 $\mu$m no more than 25% of the upper core limit, whereby the cores by means of a sieve or by spreading of a proportioned quantity sieve pressure gages, vibration distribution and the like are disposed in one layer spaced apart from each other, which surpass at an average the core size appreciably, onto which plate covered with cores the second plate is disposed, these method steps are continued up to the reaching of the desired number of plates, whereby the total pile is heated up with exertion of pressure, whereby at the edge zones with the provision of gaps of filling-or airing-openings are hermetically connected and finally brought to cooling down, whereupon the crystal liquid is filled in and the filling-or airing-openings, respectively, are hermetically closed.

Upon presence of a 15 hours stress releaving temperature (strain point) of the core material lower in comparison with the plate material advantageously the total pile is heated up to a temperature, which surpasses the 15 hour-stress releaving temperature (strain-point) of the core material and the 15 hour-stress releaving temperature of the plate material is not reached, whereby the cores are pressed together to the open distance to be produced and adhere by engagement of the face to the plates or foreign layers by engagement of their faces.

Upon presence of a 15 hour stress releaving temperature (strain-point) of the core material compared with the plate material equal or higher in comparison with the plate material suitably the total pile is heated to a temperature which surpasses the 15 hour stress relieve temperature (strain-point) of the plate material. The plate can thereby be pressed and connected together over parts of their edges during the heating (hot press welding).

The production method in accordance with the present invention offers first of all the advantage, to be capable of rationalization with a comparatively low expenditure.

With these and other objects in view, which will become apparent in the following detailed description, the present invention which is shown by example only, will be clearly understood in connection with the three embodiments, and in connection with the accompanying drawings, in which:

FIG. 1 is a section along the lines 1—1 of FIG. 2;

FIG. 2 is a top plan view of the liquid crystal cell, designed in accordance with the present invention;

FIG. 3 is a perspective view shown in an enlarged scale by a partly broken upper portion of the liquid crystal cell;

FIG. 4 is a fragmentary view of the liquid crystal cell shown at an enlarged scale;

FIG. 5 is another embodiment of the fragmentary showing in FIG. 4;

FIGS. 6 to 9 show top plan views of different embodiments of thin layer electrodes;

FIG. 10 is a section through a liquid crystal cell having a plurality of layers; and FIG. 11 is a section through a curved liquid crystal cell.

Referring now to the drawings and in particular to FIGS. 1 to 5, a liquid crystal cell is disclosed which indicates the basic principle of the present invention. The liquid crystal cell comprises two glass plates 1 and 2 covered practically totally on the inside with thin layer-electrodes 11 and 12, between which glass plates 1 and 2 a single layer of cores 3 of insulating material is disposed, through which the open space of the plates is determined. The cores or crystals 3 are thereby, for the sake of clearness and better showing indicated in the drawing, shown of a greater height. At their edge zones 4, 5, 6 and 7 the glass plates are hermetically connected together by hot pressing welding, whereby it is to be understood as the application of heat and pressure. At two corners filling-or-air-openings, respectively, 8 and 9 are recessed by providing, by example, during the hot press welding at the place of the openings 8 and 9 to be produced, wires of a material with greater thermic expansion coefficients compared with the material of glass plates, as about copper, which wires can be easily removed after cooling off whereby the desired openings 8 and 9 are created. Through one of these openings 8 a nematic crystal liquid 10 or a mixture with a nematic crystal liquid as main component is filled in, while through the other opening 9 the air can escape. The openings 8 and 9 are closed up by means of epoxy resin 13 and 14, whereby only very small engaging faces of the epoxy resin 13 and 14 with the crystal liquid 10 and in particular at a "dead arm," occur. The number of the openings 8 and 9 is, as a matter of course, not limited to two, nor must they be at the corner diagonally opposite each other, the shown embodiment has been found as particularly practical. The closure of the openings 8 and 9 can take place also by welding or melting. Upon application of a voltage to the thin layer-electrodes 11 and 12, the previously open transparent nematic crystal liquid 10 becomes in known manner opaque, whereby the degree of the shading depends upon the magnetizing force. For this reason, it is of essence, to maintain the distance of the plates 1 and 2 exactly over the entire surface, for which, in accordance with the present invention, the cores 3 serve. The control can also take place by means of a magnetic field, in which case the thin layer-electrodes 11 and 12 are dispensible.

If one choses for the cores 3 a transparent working material, which has at least approximately the same refraction index as the crystal liquid 10, the cores become practically invisible, for which reason they are not seen in FIG. 2.

In order to show clearly the principle of the present invention, a section of the liquid crystal cell is shown enlarged in a perspective fragmentary view in FIG. 3. One portion of the glass plate 1 and the thin layer-electrode 11 have been broken away. The distance between the plates 1 and 2 amounts in reality $10^0$ to $10^2$ $\mu m$, in a realized example 20 $\mu m$ the thickness of the thin plates 1 11 and 12 lies at the order of 0.5 $\mu m$. It is apparent, that the medium distance of the cores 3 surpasses the core size appreciably, about at least 10 times, where by, the space required by the cores 3 is at a maximum of about 1% of the space remaining from the crystal liquid 10. Though the cores 3 thus take only very little space and can also be brought optically to disappearance, they effect a decisive improvement of the rigidity of the cell and of the uniform distancing of the glass plates 1 and 2 over the face. The thickness of the glass plates 1 and 2 can thereby be reduced compared with known structures, which enlarges the possibility of use of liquid crystal cells. A further advantage of the present invention resides in the fact, that no more such high requirements must be set to the surface quality of the glass plates 1 and 2, as in the known embodiments.

Referring now again to the drawings and in cores to FIGS. 4 and 5, these Figures show a strongly enlarged section of FIG. 1 and in particular two embodiments of the distancing of the glass plates 1 and 2 by the cores 3. In the embodiment according to FIG. 4 the core working material softens before the plate working material, while in the embodiment according to FIG. 5 the plate working material softens before the core working material. These two embodiments are to be understood as extremes between which flowing transitions exist. If by example the glass plates 1 and 2 and the dore 3 are of the same glass, a not so strongly penetration of the cores 3 into the glass plate 2 similar to FIG. 5 results, because the temperature of the cores 3 will remain back during the heating process relative to the glass plates 1 and 2. The last embodiment offers the best rigidity results. The cores 3 can thereby engage the thin layer-electrodes 11 and 12, as shown in FIGS. 4 and 5 in connection with the plate 2 (thin-layer-electrode 12), whereby it can press in the thin layer-electrode 12 also somewhat into the plate 9 (FIG. 5). They can separate, however, the thin layer-electrodes 11 and 12, as is shown in plate 1 (thin layer-electrode 11).

Since the liquid crystal cells, designed in accordance with the present invention, are designed robust of chemically and termically permanent working material, it is suitable without further protection and measures for crystal liquids of the most different types, thus in addition such with the anisotropic range at room temperature also for such with higher and lower disposed anisotropic range.

As stated, in the embodiment of a liquid crystal cell controllable by electric fields, it is necessary to cover the glass plates 1 and 2 in known manner at the inside with thin layer-electrodes 11 and 12. Such transparent thin layer-electrodes 11 and 12 are produced by example of tin oxide or indium oxide and reflecting, by example, of aluminum. If one covers the entire plate face with thin layer-electrodes 11 and 12, one obtains an electrically controllable light gate or an electrically controllable reflector of the simplest type, respectively. At the edge zones 4 and 6 only one thin layer-electrode 11 and 12 is guided outwardly, as by example, in FIG. 3 for the thin layer-electrode 12 is shown at the edge zone 6. At the edge zones 5 and 7 small thin layer-electrodes 11 and 12 are applied.

By formation of the thin layer-electrodes 11 and 12 in the most different configuration, it is knowingly possible to produce control different signs, by example, numbers and letters.

FIGS. 6 to 9 show known embodiments therefor. The glass plate 15 shown in FIG. 6 in elevation carries, by example, a thin layer electrode configuration 16, 17, 18, 19, 20, 21 and 22, as it is conventional for a sieve segment number indication display. The glass plate 23 shown in FIG. 7 is likewise covered by a thin layer-electrode 24, which can serve as counter electrode for the one shown in FIG. 6.

FIGS. 8 and 9 show further examples for practically often used thin layer-electrode configurations. The glass plate 25 shown in FIG. 8 has vertically extending paths of thin layer-electrodes 26a to 26g, while the glass plate 27, shown in FIG. 9, has horizontally extending paths of thin layer-electrodes 28a to 28g. If one forms with the glass plates covered with the paths of thin layer-electrodes 26, 28 a liquid crystal cell in accordance with FIGS. 1 and 2, one obtains the known screen, whereby only that small range "point" comes to lighting, the horizontal and vertical electrodes 26 and 28 of which is applied to voltage.

FIG. 10 shows a section through a liquid crystal cell in accordance with the present invention having a plurality of layers and in particular three layers. Four glass plates 29, 30, 31 and 32 are spaced apart from each other by one layer of cores 3 and connected together at the edge zones 33 and 34 by means of glass solder 35. In order to fill crystal liquid into the intermediate spaces suitably similar to FIG. 2 at two oppositely disposed corners for each layer 36, 37 and 38, two filling- and airing-openings 8 and 9 are provided, whereby the openings 8 and 9 of the mediate layer is set off diagonally advantageously relative to those of the first and third layers. The openings can be produced by omitting of a split during application of the solder glass quantity, which takes place suitably by means of sieve pressure. Each layer 36, 37 and 38 of crystal liquid is specially completely separated from the remaining portions. Furthermore, it is possible to provide transparent thin layer-electrodes insulated from each other at the upper side and the bottom side of the glass plates 30 and 31, the glass plates 39 and 32 require merely on their inner side thin layer-electrodes, so that also in relation to their electrical control a complete separation is possible. Thus it is apparent that each layer 36, 37 and 38 of crystal liquid is completely independent from the remaining portion and can therefore also consist of different crystal liquids or dotted with different foreign matter by example coloring material. The practical application of a multi layer liquid crystal cell is essentially simplified by the possibility, according to which in accordance with the present invention the glass plates 29, 30, 31 and 32 are formed thin without loss of robustness, if not made possible at all.

For the formation of the liquid crystal cell, in accordance with the present invention, as an image screen, the glass plates have in known manner, similar to the glass plates 25 and 27 in FIGS. 8 and 9, thin layer-electrodes 26 and 28. An image screen for a color television receiving device is suitably constructed similar to FIG. 10, whereby the thin layer-electrodes are disposed similar to FIGS. 8 and 9.

In accordance with the present invention it is now possible without great expenditure to produce curved crystal liquid cells. FIG. 11 shows a scetion through a curved liquid crystal cell. It is at first exactly constructed as the crystal cell shown in FIGS. 1 and 2. After or simultaneously with the hot press welding the glass plates 39 and 40 spaced apart already by the cores 3 are brought in a form of a working material which is not wetted by glass, by example, graphite or boron nitrate, whereupon by heating in the transformation range of the glass used for the glass plates 39 and 40, the glass plates deform in desired manner, which form is retained after cooling off. Only then the crystal liquid 10 is filled in.

While I have disclosed several embodiments of the present invention, it is to be understood, that these embodiments are given by example only and not in a limiting sense.

I claim:

1. A method of producing a liquid-crystal cell comprising the steps of:
   a. distributing substantially uniformly over a surface of a first plate grains of a particle size deviating by no more than 6 microns for grains of a particle-size range with an upper limit of 25 microns and deviating by no more than 25% of the upper particle-size limit for grains of a particle size range of more than 25 microns;
   b. spacing the grains distributed on said first plate in a single layer with an intergrain spacing appreciably exceeding on the average, the grain size;
   c. applying a second plate to said layer of grains on said first plate and covering said second plate with a second layer of grains;
   d. repeating steps (a) - (c) to form a stack of plates with respective single layers of grains between successive plates to define respective compartments until the stack attains a predetermined number of plates;
   e. heating and applying pressure to said stack of plates to bond the plates of said stack to said grains together;
   f. hermetically sealing the pairs of plates defining each compartment together at their respective edge zones while leaving filling and venting openings therealong;
   g. cooling said plates;
   h. filling each of said compartments with a liquid-crystal material; and
   i. hermetically closing said openings.

2. The method defined in claim 1 wherein said grains have a 15-hour-stress-relieving temperature which is less than that of said plates, said stack being heated to a temperature exceeding the 15-hour-stress-relieving temperature of said grains but below the 15-hour-stress-relieving temperature of said plates, said plates being pressed together to define the interplate width of each compartment.

3. The method defined in claim 1 wherein the plates are hermetically connected along their edges at least in part by glass solder.

4. The method defined in claim 3 wherein said glass solder is applied by screening onto said plates.

5. The method defined in claim 1 wherein said plates have a 15-hour-stress-relieving temperature below that of said grains, said method comprising heating said stack of a temperature above the 15-hour-stress-relieving temperature of said plates but below that of said grains.

6. The method defined in claim 1 further comprising bending said stack during the heating thereof.

* * * * *